United States Patent

Watts

Patent Number: 5,265,422
Date of Patent: Nov. 30, 1993

[54] PILOT-OPERATED PRESSURE OVERRIDE VALVE

[75] Inventor: Thomas Watts, Ames, Iowa

[73] Assignee: Sauer Inc., Ames, Iowa

[21] Appl. No.: 883,683

[22] Filed: May 15, 1992

[51] Int. Cl.⁵ .............................................. F16D 39/00
[52] U.S. Cl. .................................. 60/488; 91/505; 417/218
[58] Field of Search ............... 60/487, 488, 489, 490, 60/491, 452; 91/505, 506; 417/218, 222

[56] References Cited

U.S. PATENT DOCUMENTS

| | | | |
|---|---|---|---|
| 2,931,177 | 4/1960 | Teumer | 60/488 |
| 3,480,832 | 11/1960 | Person | |
| 3,508,847 | 9/1968 | Martin | |
| 3,581,264 | 5/1971 | Person | |
| 3,788,077 | 1/1974 | Johnson | |
| 4,116,002 | 9/1978 | Knapp et al. | 60/488 X |
| 4,142,841 | 3/1970 | Claar et al. | |
| 4,381,646 | 5/1983 | Ruseff et al. | |
| 4,462,210 | 7/1984 | Pollman et al. | |
| 4,527,958 | 7/1985 | Borman | |
| 4,617,797 | 10/1986 | Williams | 60/452 X |
| 4,756,157 | 7/1988 | Appel | 60/488 X |
| 4,773,220 | 9/1988 | McFarland | 60/488 X |
| 4,907,408 | 3/1990 | Barker | 60/489 X |

FOREIGN PATENT DOCUMENTS 64802 6/1978 Japan.
119982 9/1980 Japan.

Primary Examiner—Edward K. Look
Assistant Examiner—Hoang Nguyen
Attorney, Agent, or Firm—Zarley, McKee, Thomte, Voorhees & Sease

[57] ABSTRACT

A pilot-operated pressure relief valve is provided for a hydrostatic transmission. The override valve is in the closed circuit loop, which includes a pair of multi-function valves and a displacement control valve. The pressure override valve includes a spool slideably mounted within a body so as to be responsive to a pressure differential created by pilot flow through the override valve. The spool is biased to a normal position which provides fluid communication between a pressure charge source and the displacement control valve. As the pressure differential in the override valve increases, the spool shifts so as to close such communication from the charge source to the control valve, thereby defeating the pressure signal from the control valve to the servos of the hydrostatic transmission pump. As the pressure differential increases further, the spool of the override valve shifts further so as to provide communication between the control valve and tank, thereby allowing the fluid in the high side servo to flow backwards through the control valve to tank. The close circuit loop includes a plurality of plugs which are selectively opened and closed to provide different loop configurations.

12 Claims, 2 Drawing Sheets

I

PILOT-OPERATED PRESSURE OVERRIDE VALVE

BACKGROUND OF THE INVENTION

Hydrostatic transmissions having a pair of hydraulic displacement units connected in a closed loop circuit are well known. One of the displacement units functions as a pump and the other unit functions as a motor. The pump is normally variable and operates to supply fluid under pressure in a high pressure line side of the closed loop circuit to the motor. A low pressure line of the closed loop circuit directs fluid from the motor back to the pump. Various controls for protecting the hydrostatic transmission from over-pressure are conventional, and include pressure relief valves, pressure compensators, and pressure limiters.

U.S. Pat. No. 4,617,797 describes a pair of multi-function valves for a hydrostatic transmission. The multi-function valves each provide a pressure limiter function, a high pressure relief function, a charge check valve function, and a bypass function. A displacement control valve modulates the hydraulic pressure in a pair of servo cylinders such that the proper unit output is maintained. However, if the system pressure becomes higher than a pre-set amount, the multi-function valve ports oil into the lower servo which is tanked across a built-in orifice in the displacement control valve. The flow to tank across the orifice generates a back pressure in the servo, allowing the swashplate to readjust to a lower pressure. This flow is also used as the pilot flow for the high pressure relief valve function of the multi-function valve.

Among the problems of multi-function valves are that loss of flow can adversely affect other functions; viscosity changes sometimes result from increased temperature which may affect fluid leakage; high and low charge pressures can adversely affect the pressure limiter; the large size of the orifice in the high pressure relief valve sometimes inhibits the valve from fully opening; the endcaps must be configured either as left-hand or righthand rotation assemblies which is expensive; the housing castings are more complex and difficult to create; and contamination entering the clearance between the piston and the bore is seldom flushed out.

Accordingly, a primary objective of the present invention is the provision of an improved hydrostatic transmission.

Another objective of the present invention is the provision of a pilot-operated pressure override valve for a hydrostatic transmission which overcomes the problems associated with circuitry using a direct connection between the multi-function valves and the displacement control valve.

A further objective of the present invention is the provision of a hydrostatic transmission having a selective configuration for directing oil from either or both of the multi-function valves to or around a pressure override valve.

Another objective of the present invention is the provision of a pilot-operated pressure override valve having flow through the valve.

Still another objective of the present invention is the provision of a pressure override valve which is not sensitive to the rotational direction of the pump shaft in a hydrostatic transmission.

A further objective of the present invention is the provision of a pilot-operated pressure override valve which maintains a substantially constant delta pressure.

Yet another objective of the present invention is the provision of a pilot-operated pressure override valve having minimal variability of set pressure.

Another objective of the present invention is the provision of a pilot-operated pressure override valve having no loss flow from the charge circuit.

Still another objective of the present invention is the provision of a non-dissipative pilot-operated pressure override valve.

These and other objectives will become apparent from the following description of the invention.

SUMMARY OF THE INVENTION

The pilot-operated pressure override valve of the present invention is used in conjunction with a hydrostatic transmission having a pair of multi-function valves, a displacement control valve, and a charge pump. The pilot-operated pressure override valve is provided in the closed loop circuit between the multi-function valve and the displacement control valve. A plurality of plugs are also provided in the closed loop so as to allow selective direction of flow from either or both of the multi-function valves to or around the pressure override valve.

The pressure override valve includes a valve body with a slideable spool mounted therein. The valve body includes an inlet port in fluid communication with the multi-function valves, and an outlet port in fluid communication with the charge pump. The spool has a passageway therein, allowing fluid flow through the pressure override valve. The spool passageway includes an orifice to create a pressure drop, thereby allowing the spool to shift within the spool body. The spool is normally biased to a first position wherein an annular groove in the spool provides communication between the charge pump and the displacement control valve. Once a predetermined pressure differential across the spool orifices is reached, the spool slides within the valve body so as to cut off the pressure source to the control valve. Increased pressure in the override valve causes the spool to move further within the valve body, thereby providing fluid communication from the control valve to tank.

DETAILED DESCRIPTION OF THE INVENTION

Figure 1:
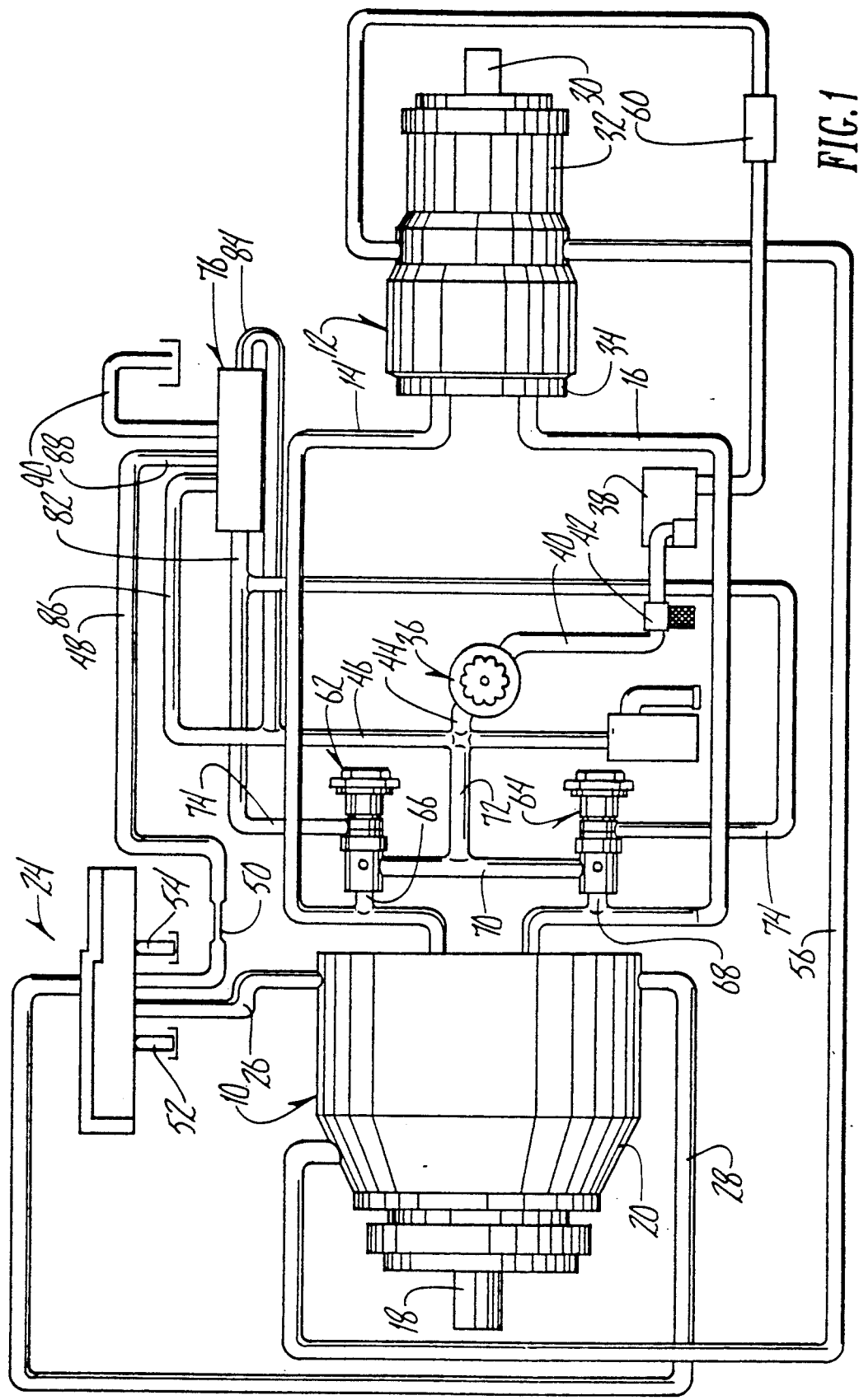
FIG. 1 is a hydraulic circuit diagram of a hydrostatic transmission utilizing a pair of multi-function valves, a displacement control valve, a charge pump, and a pilot-operated pressure override valve of the present invention.

A hydrostatic transmission circuit is shown in FIG. 1, and includes a hydraulic displacement pump 10 and a hydraulic motor 12. The pump and motor are connected in a closed loop circuit by a pair of pressure lines 14, 16, which may be hoses or passages in a housing for the pump and motor. In normal operation, pump 10 delivers fluid under pressure to motor 12. The pressures in lines 14 and 16 are opposite one another, such that one line is high pressure while the other line is low pressure.

The structure and operation of pump 10 is similar to that disclosed in U.S. Pat. No. 4,617,797. Generally, pump 10 is an axial piston unit having an input shaft 18 connected to a rotatable cylinder block (not shown). Pistons are mounted in axially-extending bores in the cylinder block, with the stroke of the pistons being controlled by a reversible swashplate. This structure is housed within pump housing 20. Housing 20 has ports which are connected to pressure lines 14, 16. The position of the swashplate is adjustably controlled by a displacement control valve 24 and a pair of servo cylinders (not shown) operatively mounted within housing 20 and connected to control valve 24 through lines 26, 28. The structure and operation of control valve 24 is also described in U.S. Pat. No. 4,617,797.

Motor 12 has an output shaft 30 splined to a cylinder block (not shown) rotatively mounted within a housing 32. The cylinder block has a series of axially-extending bores, each of which receives a movable piston which is associated with a fixed swashplate. An endcap 34 of housing 32 has ports associated with pressure lines 14, 16, such that fluid flowing from pump 10 through one of the pressure lines can be directed to the piston chambers for causing rotation of the cylinder block and the output shaft 30. The structure and operation of motor 12 is described in more detail in U.S. Pat. No. 4,617,797.

A conventional charge pump 36 supplies make-up fluid to the closed loop circuit, and also supplies charge pressure for control functions. Charge pump 36 has an inlet which is connected to a fluid reservoir 38 via a line 40. A filter 42 is provided in line 40. Charge pump 36 has an outlet connected to displacement control valve 24 by lines 44, 46 and 48. Line 48 has an orifice 50 therein.

Control valve 24 has a valve member (not shown) slideably positioned within a housing to control communication of charge pressure with one or the other of the servo cylinders in pump 10. The other servo cylinder is operatively connected to reservoir 38 through the control valve 24 and lines 52, 54, each of which have a flow-restricting orifice therein.

Pump 10 and motor 12 are also connected by a housing drain line 56. Another drain line 58 connects pump 10 and motor 12 to reservoir 38. A heat exchanger 60 is provided in line 58.

A pair of multi-function valves 62, 64 are provided in the closed loop circuit of the hydrostatic transmission. Valves 62, 64 are connected to lines 14, 16, by lines 66, 68, respectively. Valves 62, 64 have identical structure, as described in U.S. Pat. No. 4,617,797. Each of the multi-functions valve 62, 64 also have a port communicating with charge pump 36 via lines 70, 72. An outlet line 74 is also provided in each multi-function valve 62, 64. Line 70 serves the high pressure relief function of valve 62, 64 while line 74 serves the pressure limiter function of the valves.

The above description generally describes the basic components of a hydrostatic transmission, and does not constitute a part of the present invention. The details and operation of these components are described in U.S. Pat. No. 4,617,797 which is incorporated herein by reference, in its entirety.

Figure 2:
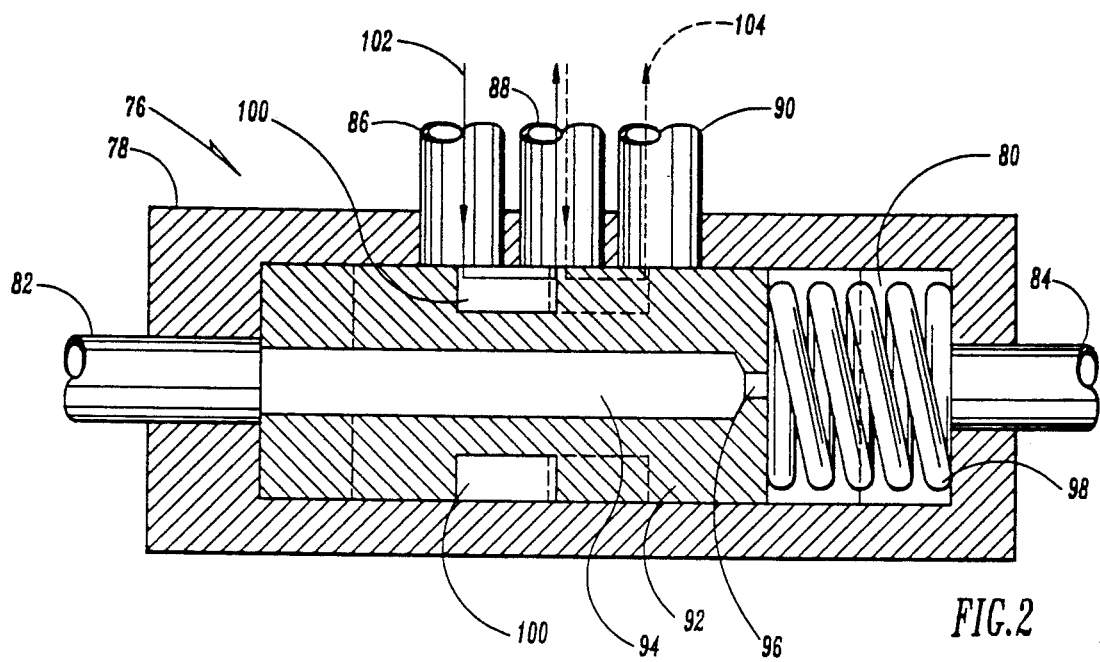
FIG. 2 is an enlarged sectional view of the pressure override valve.

The present invention is directed, in part, to a pilot-operated pressure override valve 76. Valve 76 is placed in the control circuit so as to provide communication between various components of the transmission. The structure of valve 76 is shown in FIG. 2. The function of valve 76 is identical with respect to multi-function valves 62, 64, and therefore only the operation with valve 62 will be described.

More particularly, valve 76 includes a valve body 78 having a chamber 80 therein. An inlet line 82 provides communication from the pressure limiter outlet line 74 of multi-function valve 62 into chamber 80. An outlet line 84 provides fluid communication between chamber 80 and charge pump 36 via lines 46, 44.

Valve body 78 also has three ports in the sidewall of the body. As seen in FIG. 2, a control pressure inlet line 86 is connected to the valve body so as to provide communication between chamber 80 and charge pump 36 through lines 44, 46. A reversible control pressure line 88 provides communication between chamber 80 and control valve 24 via line 48. A drain line 90 provides communication from chamber 80 to tank.

A valve spool 92 is slideably mounted within chamber 80 of pressure override valve 76. Spool 92 includes an axial passageway 94 through which fluid can flow from inlet line 82 to outlet line 84. The end of passageway 94 has a restricted orifice 96 which creates a pressure differential such that spool 92 is slideably moveable within chamber 80.

A spring 98 within valve body 78 normally biases spool 92 to a first position, as seen in solid lines in FIG. 2. As spool 92 slides within valve body 78, an annular groove 100 in spool 92 provides communication between lines 86, 88 and 90. More specifically, in the normal operating position of spool 92, groove 100 provides communication between lines 86 and 88 such that fluid under pressure flows from charge pump 36 to displacement control valve 24, as represented by arrow 102 in FIG. 2. When the pressure differential across orifice 96 reaches a pre-determined level, spool 92 begins to slide within body 78. As the spool slides, groove 100 moves out of alignment with line 86, so as to be in a second position aligned with only line 88. By closing off the communication from charge pump 36 to control valve 24, the pressure signal from the control valve to the servos of pump 10 is defeated.

As the pressure differential increases, spool 92 slides further to the right, so as to provide communication between lines 88 and 90. In this third position, as shown by the broken lines in FIG. 2, groove 100 provides communication between the control valve 24 and tank, as designated by arrow 104 in FIG. 2. When spool 92 is in this third position, fluid in the high side servo is allowed to flow backwards through control valve 24 to tank.

Thus, in the operation of the hydraulic transmission, when the fluid pressure in the loop reaches a first pre-determined level, the pressure limiter function of the multi-function valve is actuated. This actuation of the pressure limiter function allows pilot flow to pressure override valve 76. As the pressure increases further and the pressure differential across orifice 96 reaches a pre-determined level, spool 92 shifts from the first position to the second position within valve body 78, thereby cutting off pressure to control valve 24. If the pressure in the loop continues to increase, spool 92 shifts from the second position to the third position within valve body 78, such that control valve 24 is vented to tank, If the pressure in the loop increases still further, the high pressure relief function of multi-function valve 62 is actuated.

Figure 3:
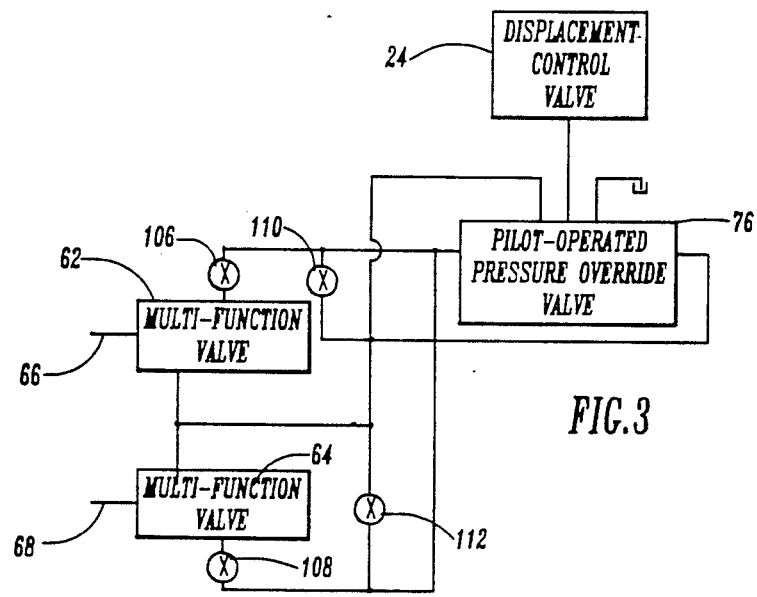
FIG. 3 is a schematic hydraulic circuit diagram showing plugs which allow alternative circuit configurations.

Actuation of the pressure limiter valve of the multi-function valves 62, 64 and actuation of the pilot-operated pressure relief valve 76 unloads the transmission. Actuation of the high pressure relief valve of the multi-function valves 62,64 does not unload the unit. Since some users prefer that the unit remain loaded, a plurality of plugs 106, 108, 110 and 112 are provided to allow selective configuration of the circuitry, as seen in FIG. 3. These plugs allow pilot flow from one or both multi-function valves 62, 64 to be directed to or around override valve 76. The following table shows the configuration variations for the circuit. In the table, POR designates the pilot-operated pressure override valve 76, as it is associated with the respective multi-function valve 62, 64.

During operation of the system, there is no loss of flow from the charge circuit, since the pilot flow returns to charge pressure through valve 76.

From the foregoing, it can be seen that the present invention accomplishes at least all of the stated objectives.

I claim:

1. A method of overriding pressure in a hydraulic transmission system having a hydraulic circuit comprising a pump and a motor, a pair of multi-function valves, a displacement control, a charge pressure source, and a pilot-operated pressure override valve, the method comprising:

providing pilot flow from one of the multi-function valves to and through the override valve;

| CONFIG-URATION | POR 62 | POR 64 | PLUG 106 | PLUG 108 | PLUG 110 | PLUG 112 |
|---|---|---|---|---|---|---|
| 1 | OPERATIVE | OPERATIVE | OPEN | OPEN | CLOSED | CLOSED |
| 2 | OPERATIVE | NON-OPERATIVE | OPEN | CLOSED | CLOSED | OPEN |
| 3 | NON-OPERATIVE | OPERATIVE | CLOSED | OPEN | OPEN | CLOSED |
| 4 | NON-OPERATIVE | NON-OPERATIVE | CLOSED | CLOSED | OPEN | OPEN |

In each of the configurations, the high pressure relief valve of the multi-function valves remain functional. In Configuration 1, the pressure override valve 76 is operative for both multi-function valves 62, 64. In Configurations 2 and 3, the override valve is operative for only one of the multi-function valves. In Configuration 4, the override 76 is bypassed so as to be non-operative for both multi-function valves. The variable configurations allow the end user to selectively chose the pressure protection for the circuitry, as the individual needs specify.

The pilot-operated pressure override valve 76 utilized in a hydrostatic transmission has many advantages over known transmission. For example, the valve function is non-dissipative, such that there is a lower delta pressure with continuing flushing action of the pilot flow through the valve during operating. Furthermore, valve 76 is not sensitive to the rotational direction of shaft 18 of pump 10. The valve functions for both left hand and right hand rotation units.

The set pressure of override valve 76 is not dependent upon charge pressure variations, and delta pressure is maintained substantially constant, regardless of set pressure. The maintenance of the delta pressure is significant because normal applications of closed circuit units involve generation of a torque, which is a function of delta pressure, not merely high pressure. Also, the set pressure of valve 76 is not a function of the swashplate moments, so there is a much lower set pressure variability under varying conditions.

The dissipative high pressure relief valve of each multi-function valve is staged together with the non-dissipative pressure override valve 76, such that a change in the set pressure of the high pressure relief valve affects the set pressure of the override valve. Furthermore, the two sides of the loop can be set at independent pressures. The staging differential set pressure between the high pressure relief valves and the pressure override valve is set by the orifice difference between the two functions.

moving a spool from a first position within the override valve in responses to pilot flow pressure so as to stop flow of fluid from the charge pressure source to the displacement control, and selectively opening and closing one or more plugs to direct pilot flow from the multi-function valves to or around the override valve.

2. The method of claim 1 further comprising moving the spool from the second position to a third position within the override valve in response to increased pilot flow pressure so as to allow fluid flow from the displacement control to a fluid tank.

3. The method of claim 1 further comprising providing means for normally biasing the spool to the first position.

4. The method of claim 1 further comprising creating a pressure differential in the override valve such that the spool moves within the valve once the differential reaches a pre-determined level.

5. A pilot-operated pressure override valve for a hydrostatic transmission having a hydraulic circuit comprising a pair of multi-function valves, a displacement control, a fluid tank, and a charge pressure source, the override valve comprising:

a valve body having an inlet fluidly communicating with the multi-function valves and an outlet fluidly communicating with the charge pressure source, a first port fluidly communicating with the charge source, a second port fluidly communicating with the displacement control, and a third port fluidly communicating with a fluid tank;

a spool slideably mounted within the valve body, and having a passageway extending therethrough to allow fluid flow from the inlet to the outlet so as to provide fluid flow through the override valve;

the spool being slideable within the valve body in response to pilot flow pressure from the multi-function valves; and the spool having means for providing selective communication between the first, second and third ports of the valve body as the spool slides within the valve body.

6. The pressure override valve of claim 5 wherein the spool is slideable between a first position providing fluid communication between the first and second ports, and a second position preventing such communication between the first and second ports.

7. The pressure override valve of claim 6 wherein the spool is slideable between the second position and a third position providing communication between the second and third ports.

8. The pressure override of claim 6 further comprising biasing means for normally urging the spool to the first position.

9. The pressure override valve of claim 5 wherein the passageway includes an orifice therein to create a pressure differential within the override valve for shifting the spool within the valve body when the differential reaches a predetermined level.

10. An improved hydrostatic transmission having a hydraulic circuit comprising a pump, a motor, high pressure relief means, pressure limiter means, displacement control means, charge pressure means, and closed loop circuitry, the improvement comprising:

pilot-operated pressure override means operatively connected in the circuitry to the pressure limiter means for controlling charge pressure to and from the displacement control means, an override means in said hydraulic circuit including a body with an inlet port and an outlet port through which the fluid flows, said body including a plurality of ports in communication with the charge pressure means, the displacement control means and a fluid reservoir, said override means including a spool slidably mounted within the body, the spool having a passageway through which the fluid flows between the inlet and outlet ports, said spool passageway including an orifice therein to create a pressure differential within the override means for shifting the spool within the body when the differential reaches a predetermined level.

11. The improved hydrostatic transmission of claim 10 wherein the spool includes an annular groove for providing communication between adjacent ones of the plurality of ports as the spool slides within the body.

12. The improved hydrostatic transmission of claim 11 wherein the override means includes biasing means for normally biasing the spool to a normal operating position.

* * * * *

UNITED STATES PATENT AND TRADEMARK OFFICE
CERTIFICATE OF CORRECTION

PATENT NO. : 5,265,422
DATED : November 30, 1993
INVENTOR(S) : Thomas Watts

It is certified that error appears in the above-indentified patent and that said Letters Patent is hereby corrected as shown below:

In column 6, line 27 should read:

"moving a spool from a first position to a second position within the over --.

Signed and Sealed this

Third Day of May, 1994

Attest:

Attesting Officer

BRUCE LEHMAN

Commissioner of Patents and Trademarks